United States Patent
Levijarvi (10) Patent No.: US 9,317,268 B2
(45) Date of Patent: Apr. 19, 2016

(54) RECOVERY AUTOMATION IN HETEROGENEOUS ENVIRONMENTS

(75) Inventor: Emmanuel Sheldon Levijarvi, San Rafael, CA (US)

(73) Assignee: SUNGARD AVAILABILITY SERVICES LP, Wayne, PA (US)

( * ) Notice: Subject to any disclaimer, the term of this patent is extended or adjusted under 35 U.S.C. 154(b) by 320 days.

(21) Appl. No.: 13/364,431

(22) Filed: Feb. 2, 2012

(65) Prior Publication Data
US 2013/0205292 A1    Aug. 8, 2013

(51) Int. Cl.
| | |
|---|---|
| G06F 9/445 | (2006.01) |
| G06F 15/177 | (2006.01) |
| G06F 11/14 | (2006.01) |
| G06F 9/44 | (2006.01) |
| G06F 11/30 | (2006.01) |

(52) U.S. Cl.
CPC .............. G06F 8/61 (2013.01); G06F 11/1415 (2013.01); G06F 11/3051 (2013.01); *G06F 8/63* (2013.01); *G06F 9/4416* (2013.01); *G06F 11/3031* (2013.01); *G06F 2201/86* (2013.01)

(58) Field of Classification Search
None
See application file for complete search history.

(56) References Cited

U.S. PATENT DOCUMENTS

| | | |
|---|---|---|
| 7,769,990 B1 | 8/2010 | Okcu et al. |
| 7,770,057 B1 | 8/2010 | Graham et al. |
| 7,886,185 B1 | 2/2011 | Okcu et al. |
| 7,953,703 B2 | 5/2011 | Aggarwal et al. |
| 8,037,289 B1 | 10/2011 | Karnik et al. |

(Continued)

FOREIGN PATENT DOCUMENTS

WO    WO 2006/053093    5/2006

OTHER PUBLICATIONS

European Search Report mail date Jul. 23, 2014 for European Patent Application No. 13275021.7 filed on Feb. 1, 2013 by Sungard Availability Services, LP, 6 pages.

(Continued)

*Primary Examiner* — James D Rutten
(74) *Attorney, Agent, or Firm* — Cesari and McKenna, LLP (57) ABSTRACT

A computer system may be configured to invoke drivers to one or more target machines. A controller, based on a request, may select a driver from a set of interface drivers. The controller may be configured to invoke the driver selected from the set of interface drivers. The invoked driver may issue commands to a target machine that was named in the request. The commands may install an operating system, named in the request, on the target machine.

16 Claims, 8 Drawing Sheets

(56) References Cited

U.S. PATENT DOCUMENTS

| | | |
|---|---|---|
| 2003/0014621 A1* | 1/2003 | French et al. ............... 713/2 |
| 2003/0048783 A1 | 3/2003 | Tateoka |
| 2004/0187104 A1* | 9/2004 | Sardesai et al. ............ 717/174 |
| 2004/0268340 A1* | 12/2004 | Steeb et al. ................ 717/174 |
| 2005/0132357 A1 | 6/2005 | Shell et al. |
| 2006/0005016 A1* | 1/2006 | Lee et al. ................... 713/164 |
| 2006/0265707 A1* | 11/2006 | Hayes et al. ............... 717/174 |
| 2007/0118654 A1 | 5/2007 | Jamkhedkar et al. |
| 2007/0162894 A1 | 7/2007 | Noller et al. |
| 2007/0226709 A1 | 9/2007 | Coker et al. |
| 2008/0016178 A1 | 1/2008 | Portugali |
| 2008/0046708 A1* | 2/2008 | Fitzgerald et al. ........... 713/2 |
| 2008/0065775 A1 | 3/2008 | Polk |
| 2008/0320472 A1* | 12/2008 | Laska et al. ................ 717/178 |
| 2009/0070626 A1 | 3/2009 | Chen et al. |
| 2009/0210876 A1 | 8/2009 | Shen et al. |
| 2009/0328065 A1 | 12/2009 | Wookey |
| 2010/0058396 A1 | 3/2010 | Russell et al. |
| 2010/0235828 A1 | 9/2010 | Nishimura et al. |
| 2010/0306356 A1 | 12/2010 | Gao et al. |
| 2012/0054280 A1 | 3/2012 | Shah |
| 2012/0054734 A1 | 3/2012 | Andrews et al. |
| 2012/0117241 A1 | 5/2012 | Witt et al. |

OTHER PUBLICATIONS

European Search Report mail date Jul. 23, 2014 for European Patent Application No. 13275022.5 filed on Feb. 1, 2013 by Sungard Availability Services, LP, 6 pages.

* cited by examiner

RECOVERY AUTOMATION IN HETEROGENEOUS ENVIRONMENTS

BACKGROUND

Many events, such as a natural disaster or human-induced activity, may interrupt an organization's technology infrastructure. Often organizations have policies and procedures to prepare for recovery of data or continuation of critical technology infrastructure. An organization's technology infrastructure may also be referred to as its information technology (IT) environment. An organization's IT environment may include its computers, network connections, servers, hardware, software, operating systems, databases, and application layers. For example, recovering an IT environment may include a variety of tasks such as rebuilding hardware (HW), operating systems (OS), databases, peripheral computing devices, and application layers at a time of test (ATOT) or at a time of disaster (ATOD).

Often the technology environment of an organization comprises computing devices with dissimilar hardware and software components (e.g., heterogeneous environments). For example, an organization may utilize computers with different types of processors to match different processing demands across the organization. Additionally, the IT environment of an organization may be comprised of computers with different operating systems. For example, an organization may be divided into groups, and each group may be comprised of computers with specific needs. The groups of computers may be connected via a local area network (LAN). Each group of computers may also include one or more server computers that run a network operating system, for example, to provide network services to other computers on the LAN. Computers within a group may utilize the same or different operating systems, for example, depending on the functions and/or requirements of each computer's end user.

Often a hardware device uses a device driver or software driver to allow a computer program to interact with the hardware device. For example, a device driver may act as a translator between a hardware device and the applications or operating systems that use the hardware device. A driver typically communicates with a hardware device through a computer bus or communications subsystem coupled to the hardware. A driver may send commands to the hardware device, and a hardware device may send data to the driver. Many drivers are specific to an operating system, and may also depend on the hardware. Thus, multiple device drivers may be used to recover and/or build an IT environment with dissimilar hardware and/or software.

Existing approaches to delivering recovery and continuation services lack efficiency. For example, existing approaches may require burdensome user involvement in order to install different operating systems on different hardware environments. Additionally, some existing approaches do not deploy software to target machines (e.g., computers and/or servers) in an efficient manner.

SUMMARY

Various techniques of recovery automation are disclosed herein, including a method of invoking drivers that are configured to issue commands to target machines. Systems and apparatuses for carrying out these methods are also disclosed.

In an embodiment, a controller may receive a request to install an operating system on a target machine. The request may comprise a name of an operating system to be installed and a name of a target machine. The controller may select a driver, from a set of interface divers, which corresponds to the named operating system in the request. The controller may invoke the corresponding driver. The corresponding driver may issue one or more commands to the target machine to install the named operating system on the named target machine. Various embodiments may monitor the controller and target machines. For example, the controller may be monitored to provide statuses of deployment events to a user interface.

In a computer system embodiment, the computer system may comprise a set of interface drivers. Each interface driver in the set of interface drivers is configured to issue commands to a target machine for installing an operating system on the target machine. The computer system may further comprise a controller configured to select a corresponding interface driver from the set of interface drivers. The controller may be further configured to invoke the corresponding driver, and the driver may issue commands to a target machine. For example, the controller may invoke different drivers that issue commands to target machines having different hardware environments. The computer system may further implement a state machine configured to monitor the controller and target machines. In some exemplary embodiments, the state machine may provide statuses of deployment events to a user interface of the controller.

Various embodiments may realize certain advantages. For example, using a controller to invoke various drivers may allow bare metal provisioning of dissimilar target machines. Additionally, a controller may provide a single interface between a user and dissimilar target machines, allowing enhanced automation of recovery. Accordingly, various embodiments may have increased flexibility and efficiency.

Other features and advantages of the described embodiments may become apparent from the following detailed description and accompanying drawings.

DETAILED DESCRIPTION OF ILLUSTRATIVE EMBODIMENTS

The ensuing detailed description provides exemplary embodiments only and is not intended to limit the scope of the appended claims. Various changes may be made in the function and arrangement of elements and steps without departing from the spirit and scope of the claimed subject matter.

Figure 1:
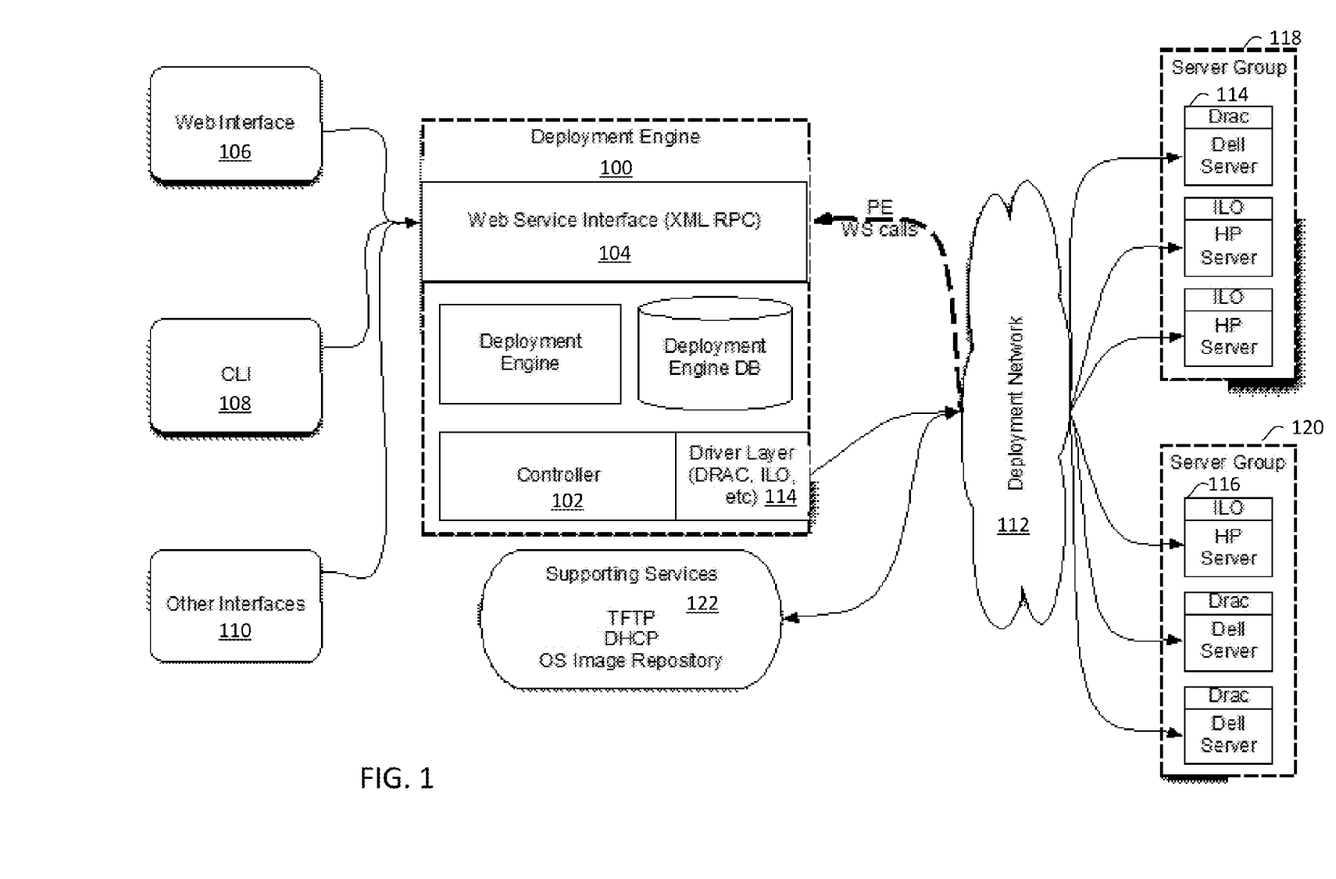
FIG. 1 is a block diagram illustrating an exemplary recovery automation system architecture.

FIG. 1 shows an exemplary recovery system architecture according to an embodiment. For example, a deployment engine 100 may enable a combination of web services, controller 102 functionalities (e.g., such as process control daemon), and state machine hardware and/or software. The deployment engine 100 may comprise a web service interface 104 that, for example, may allow a user (e.g., via a preinstallation environment and/or a user interface) to monitor and/or change an event state, an installation stage, and errors during deployment of software. Exemplary user interfaces may include a web interface 106, a command line interface (CLI) 108, and/or other interfaces 110. A user interface may allow a user, such as a recovery specialist for example, to interact with the deployment engine 100. As described herein, for example, a user may interact with the deployment engine 100 to create deployment events and dispatch deployment events. A pre-installation environment (PE) may refer to the state of a target machine with a network-bootable operating system such as Ubuntu Linux for example, and a machine in a PE may communicate with the deployment engine 100 via the deployment network 112. A machine in a PE may contain software to communicate with the deployment engine 100, and it may be configured to perform changes to its BIOS, lay down disk images, and/or stage software to be installed on a target operating system.

As described herein, a controller 102 may provide a dispatch layer for tasks to be executed against machines. The controller 102 may comprise a driver layer 114 (e.g., a set of interface drivers) that may allow it to communicate with target hardware to perform various operations such as power checking, power on, and power off for example. The deployment network 112 may allow the controller 102 to communicate with various controllers such as a Dell Remote Access Controller (DRAC) 114 or an integrated lights-out (iLO) controller 116 for example. A DRAC controller 114, an iLO controller 116, and various other controllers may interface with various target servers arranged in server groups such as server group 118 and server group 120 for example. A machine in a PE may also use the deployment network 112 to communicate with the deployment engine 100. The deployment engine 100 and/or a PE machine may use supporting services 122, for example, to support network booting and/or to fetch images and software to install on a target machine. For example, the supporting services 122 may include a trivial file transfer protocol (TFTP), a dynamic host configuration protocol (DHCP), and an operating system (OS) image repository.

As further described herein, a recovery event may be referred to as a deployment event, and a deployment event may commence at a time of test (ATOT) or at a time of disaster (ATOD). Embodiments may define a deployment event as being comprised of one or more jobs. A job may refer to the lifecycle of a single machine through a deployment event, for example, wherein the machine begins in a preparation state and ends in an undeployed state. Embodiments may define a task as a single step in the lifecycle of a job. In an embodiment, a user may create a deployment event through a user interface such as web interface 106 or CLI 108. An event may contain one or more jobs, and each job, for example, may correspond to a target machine in a data center. According to various embodiments, when jobs are deployed, a user interface may communicate to the deployment engine 100 over the web services layer 104. The deployment engine 100 may check the state of the machine corresponding to each job, for example, to verify that the machines are not in use by other events. After the check is performed, the deployment engine 100 may create a task that is received by the controller 102.

In some embodiments, the controller 102 may receive the task and determine whether a target machine is powered off. If the controller 102 determines that the target machine is powered-on, the task and associated job may be flagged as an exception. If the controller determines that the target machine is powered off, for example, it may attempt to network boot off a TFTP server after it obtains network information from a DHCP service. According to some embodiments, a network boot brings the machine to the PE. In other embodiments, such as during BIOS settings changes for example, a reboot may bring the machine to a PE. When a target machine is in a PE, it may provide a signal to the web service layer 104 to notify the deployment engine 100 that the system is ready for its next set of tasks. According to various embodiments, exemplary tasks include checking inventory, setting up RAID arrays, laying down a disk image, and preparing the BIOS of the target machine. In an exemplary embodiment, the deployment engine 100 may generate files such as Sysprep and/or Unattended install files to allow Windows to boot all to the login prompt, for example, instead of falling into the mini-setup stage of the Windows installation. In one embodiment, after laying down an image on the disk and uploading any software that will be installed on the target the machine, the target machine may undergo a final reboot and then may be ready for the operating system specific setup.

Some embodiments may also respond to an undeploy command, as further described herein. A target machine may be shut down for an undeploy command. An undeploy command may follow similar steps as a deployment, but an undeploy command may tear down a RAID array, reset the BIOS to a standard configuration, and shut the target machine down. When all jobs within an event are undeployed, the event may be at an end state and those machines may be released for a new event to use.

Figure 2:
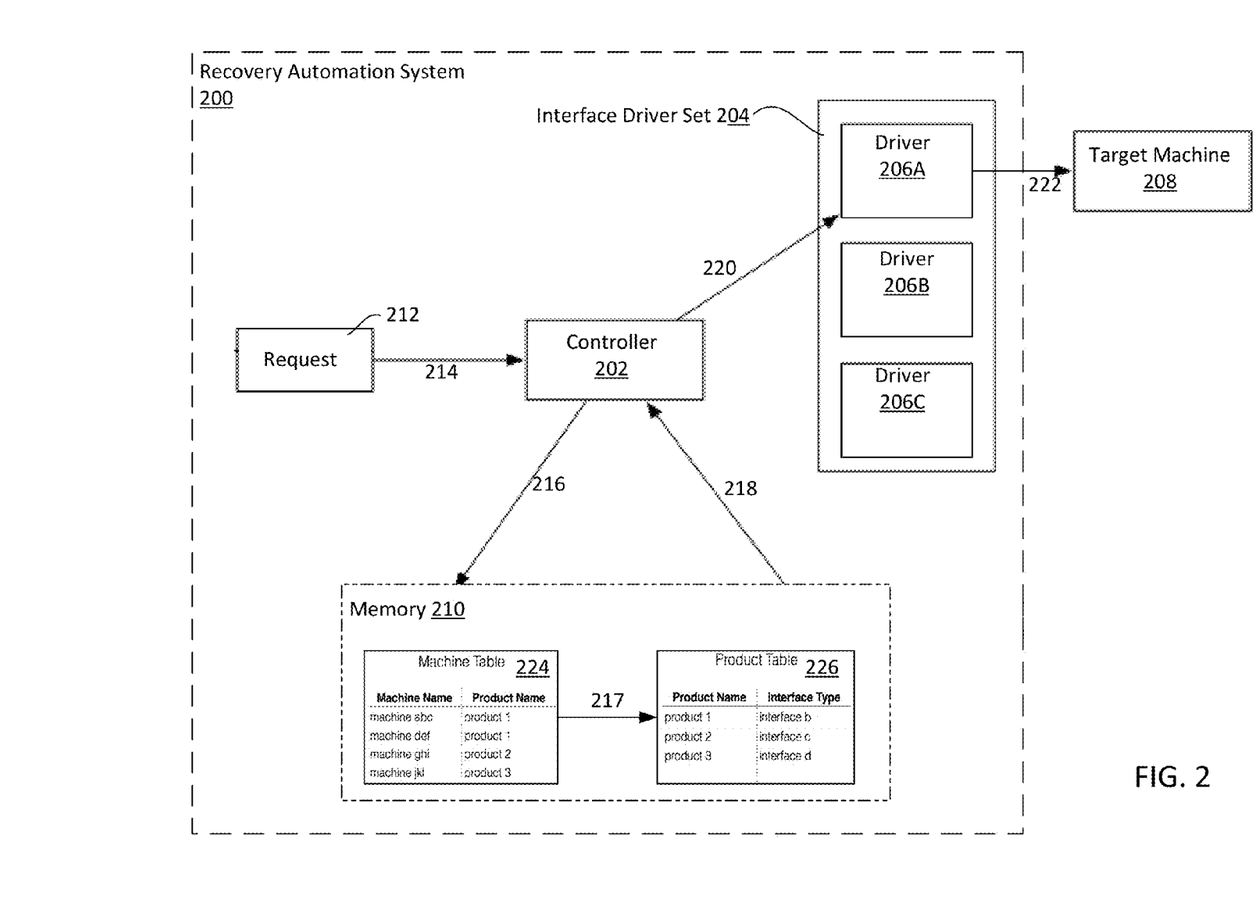
FIG. 2 is a block diagram of another exemplary recovery automation system.

FIG. 2 shows a block diagram of a recovery automation system 200 according to an embodiment. For example, the recovery automation system 200 may be implemented by a computer system, such as the computer system 800 shown in FIG. 8 and described herein. The recovery automation system 200 may also be implemented by the deployment engine 100 shown in FIG. 1. The recovery automation system 200 may comprise a controller 202 and an interface driver set 204. The controller may also be referred to as a deployment engine in various embodiments. The interface driver set 204 may comprise one or more interface drivers 206. For example, FIG. 2 shows three interface drivers 206A, 206B, and 206C; although the interface driver set 204 may comprise more or less drivers than shown in FIG. 2. For example, each interface driver may correspond to a different operating system that a user may request to be installed on a target machine 208. The set of interface drivers 204 (e.g., or interface driver layer) may provide a common interface to the controller 202 across hardware types. The interface driver layer 204 may translate a common set of commands from the controller 202 to commands that are understood by multiple, heterogeneous target machines. The controller 202 may also comprise a memory 210 which may reside internally or externally to the controller 202. The memory 210 may include random access memory (RAM) and/or read only memory (ROM).

Referring to FIG. 2, an exemplary process flow is also shown. For example, a request 212 may be received at 214 by the controller 202. In an embodiment, the request 212 may originate from a user of the recovery automation system 200 (e.g., via the web interface 106, CLI 108, or other interfaces 110 in FIG. 1). The request 212 may be received by a user interface of the controller 202 residing within and/or outside the controller 202. The request 212 may also be received via a web interface of the controller 202 for example. According to an embodiment, the request 212 may be a request to install an operating system on a target machine 208 for example. The request 212 may comprise a name of the operating system to be installed and/or a name of the target machine 208. At 220, the controller 202 may select, based on the name of the operating system in the received request 212, a corresponding driver 206A from the set of interface drivers 204. For example, at 216, the controller may use the machine name in the request 212 to determine a model (e.g., or product name) of the target machine 208. In an embodiment, each machine name may be associated with a product name in a machine lookup table 224 stored in memory 210. For example, if the request 212 comprises the machine name "machine abc", the product name "product 1" may be sent to a product table 226 at 217. According to an embodiment, the product name may be used by the product lookup table 226 to determine an interface type. The controller 202 may select an interface driver 206A for the target machine 208 after retrieving an interface type (at 218) from the product lookup table 226 that associates each product with an interface type. For example, the controller 202 may use the product table 226 to determine that "interface b" should be used for "product 1." At 220, the controller may invoke the driver 206A corresponding to the request 212. For example, the invoked driver 206A may correspond to "interface b" from product table 226. At 222, the driver 206A that is invoked by the controller 202 may issue commands to the named target machine 208 to install the named operating system on the named target machine 208. For example, "product 1" corresponding to "machine abc" from the request 212, may be installed on the target machine 208 at 222. The driver 206A may be coupled to the target machine 208 via a communication link, such as a LAN or WAN connection for example. The driver 206A may remotely control the target machine 208 via a communication link and/or by issuing commands.

Although not shown in FIG. 2, multiple target machines having different hardware environments may be coupled to the interface driver set 204. For example, multiple target machines may be coupled to the interface driver set via a deployment network such as the deployment network 112 shown in FIG. 1. Each of the interface drivers 206 may be comprised of a set of commands, for example, to install an operating system. According to an embodiment, the controller 202, based on received requests, may invoke the drivers 206 corresponding to multiple target machines having different hardware environments. For example, the controller 202 may invoke drivers 206 for various servers such as mail servers, web servers, application servers, database servers, file transfer protocol servers, and terminal servers. Additionally, the controller 202 may invoke drivers 206 that correspond to various computing systems running on a variety of hardware platforms such as Macintosh, Wintel, x86, and RISC for example. In various embodiments, each of the drivers 206 in the interface driver set 204 may correspond to a different operating system and/or a different target machine. A controller 202 may provide a single interface to multiple target machines, and the controller 202 may be capable of invoking different drivers to install different operating systems on target machines with heterogeneous hardware. In some embodiments, a user may recover an organization's IT environment using the controller 202. For example, according to an embodiment, the controller 202 may receive a request comprising a machine name and an operating system name for each target machine in an IT environment that is desired to be built and/or recovered. As will be understood to those of ordinary skill in the art, a controller according to various embodiments may implement bare metal provisioning of target machines.

Figure 3A:
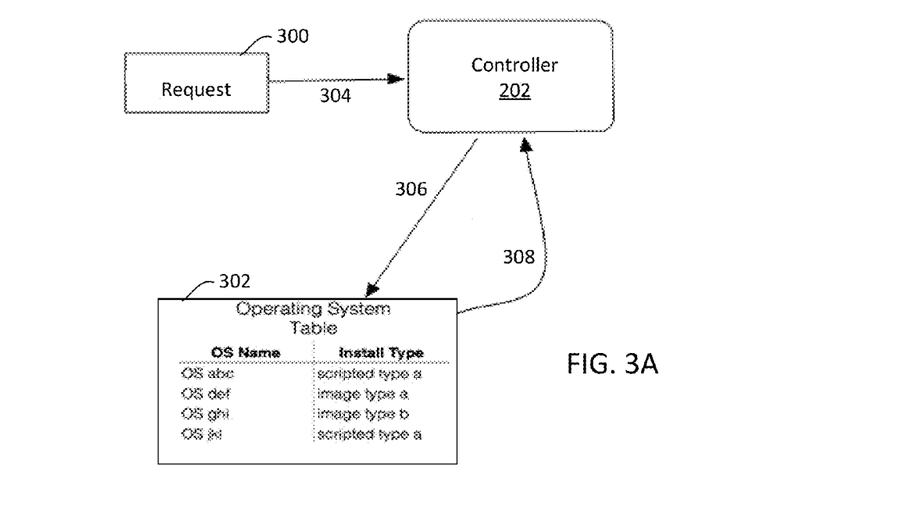
FIG. 3A is an example process flow diagram using a controller in accordance with an embodiment.

FIG. 3A illustrates a flow diagram of the controller 202 using an operating system table 302 in accordance with various embodiments. A deployment engine with web service may also comprise the controller 202. At 304 in FIG. 3A, the controller 202 may receive a request 300. The request 300 may comprise an operating system name. At 306, the controller 202 may use the received operating system name to retrieve an associated install type in the operating system table 302. For example, install type "scripted type a" may be retrieved if the operating system name is "OS abc." The operating system table 302 may be stored in the memory 210 or it may reside elsewhere or be determined elsewhere. At 308, the controller 202 may select the install type using the operating system table 302. For example, according to some embodiments the install type may be a scripted type or an image type. There may be multiple scripted types and multiple image types according to embodiments. After the install type is determined, the controller 202 may instruct one or more target machines (e.g., target machine 310 in FIG. 3B) to start a network boot sequence, such as the boot sequence in FIG. 3B with respect to target machine 310.

Figure 3B:
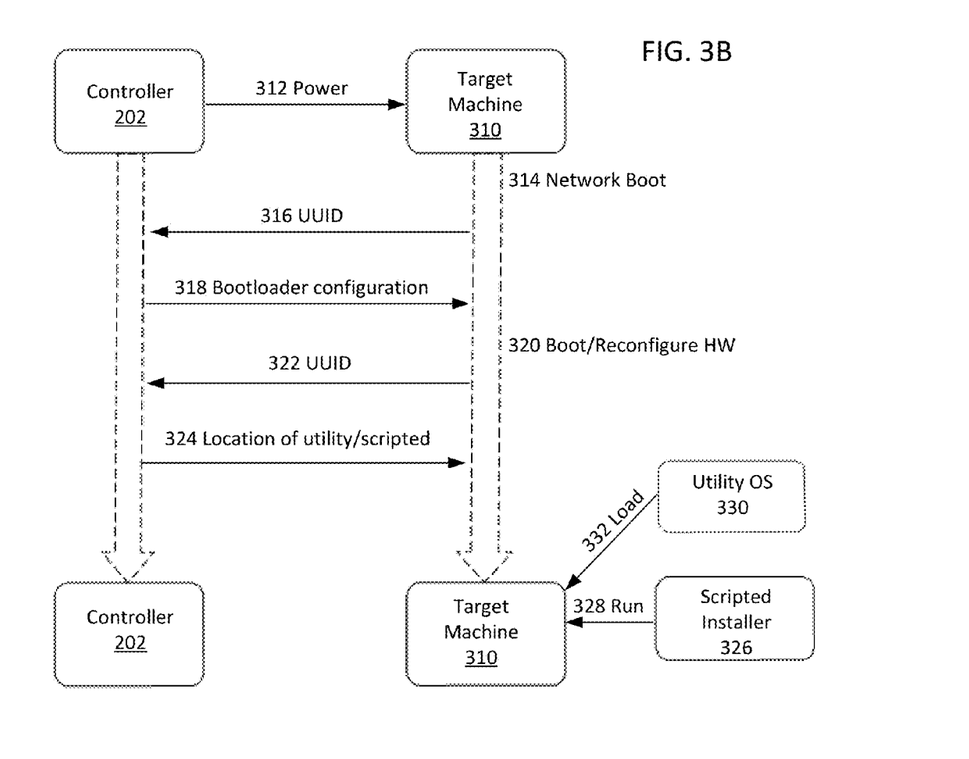
FIG. 3B is a process flow diagram of an exemplary operating system boot sequence.

FIG. 3B shows an exemplary operating system boot sequence according to various embodiments. A target machine 310 may be one target machine of a plurality of target machines coupled to controller 202. For example, the target machine 310 may correspond to a machine name from the request 300. At 312, after determining the operating system install type for example, the controller 202 may issue a power command and/or a command to start a network boot sequence to the target machine 310. At 314, the target machine 310 may load a network bootloader. At 316, the target machine 310 may send a universal unique identifier (UUID) to the controller 202. The controller 202 may respond with a boot loader configuration at 318. For example, the boot loader configuration may indicate the location of the operating system to load. At 320, the target machine 310 may boot the utility operating system and reconfigure hardware, then it may reboot. After reboot, the target machine 310 may again send the UUID to the controller 202 at 322. At 324, the controller may send, for example, a location of a utility operating system or a location of the scripted installer, to the target machine 310. The location of the operating system may depend on the installation type of the operating system corresponding to the request 300 and determined at 308 for example. If the installation type is scripted, for example, the controller 202 may send a location that points to a scripted installer 326. The scripted installer 326 may be run at 328. If the installation type is image based, for example, the utility operating system 330 comprising the imaging tools may be loaded a second time at 332. As will be understood to those of ordinary skill, the operating system boot sequence described herein may be used to install various operating systems using a variety of scripted installers and/or image tools.

Figure 4:
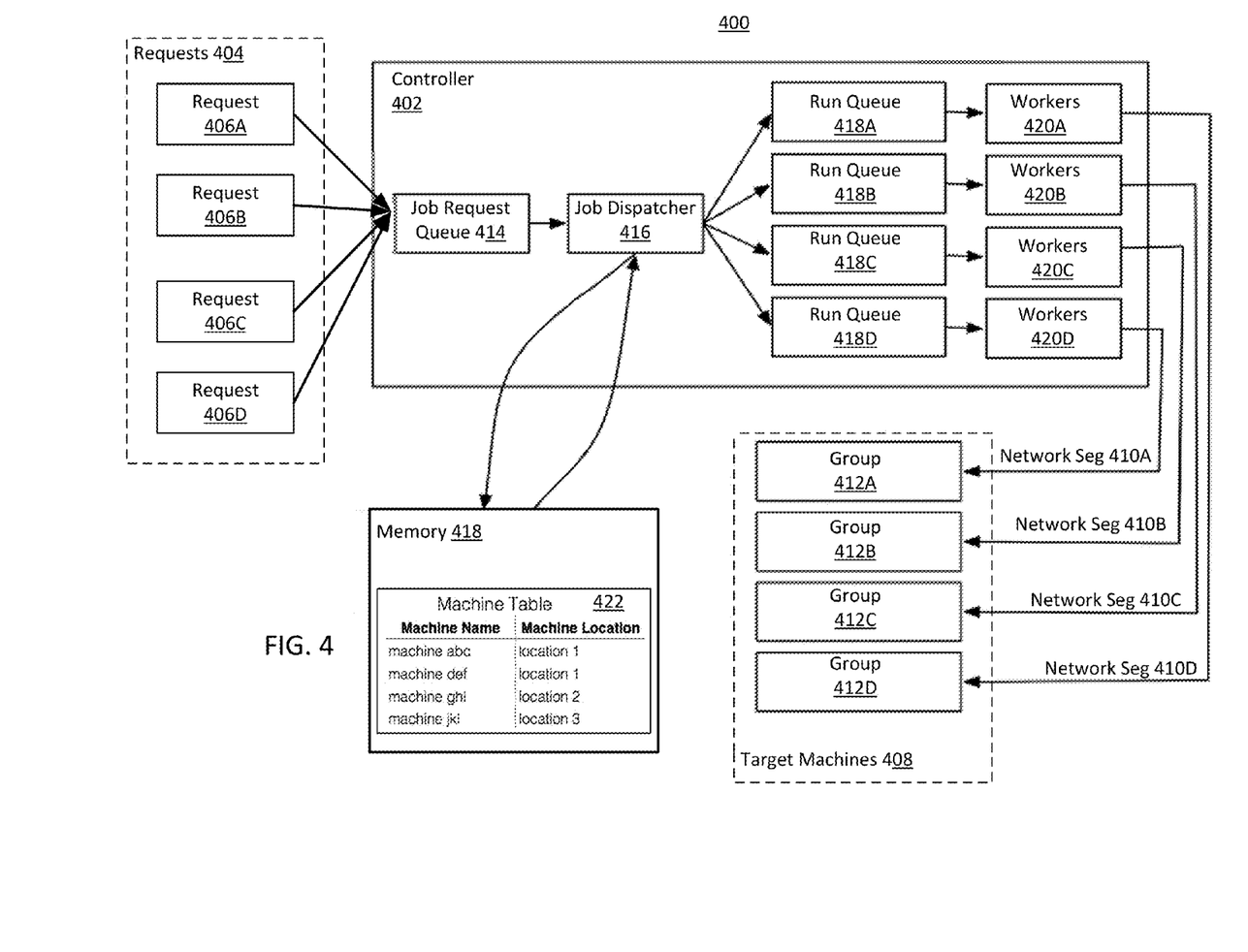
FIG. 4 is a block diagram of a computer system comprising an exemplary controller.

FIG. 4 shows a computer system 400 comprising an exemplary controller 402 in accordance with various embodiments. In an embodiment, the controller 402 may receive multiple requests 404. The requests 404 may comprise one or more different software deployment and/or installation requests, such as a request 406A, a request 406B, a request 406C, and a request 406D. Multiple requests 404 may be received in series and/or in parallel for example. As described herein with respect to the request 212 in FIG. 2, each request 406 may comprise a machine name. For example, the requests 404 may comprise user requests to deploy software to target machines 408 and/or install operating systems on a plurality of target machines 408. A network of target machines 408 may reside on multiple network segments. Although FIG. 4 shows four network segments (e.g., network segment 410A, network segment 410B, network segment 410C, and network segment 410D), embodiments may have more or less network segments than shown in FIG. 4. In an embodiment, each of the network segments 410 uplink to a core switch and each of the network segments 410 may correspond to a location, and a group (e.g., a group 412A, a group 412B, a group 412C, and a group 412D) of the target machines 412 reside at each location. A group of machines 412A may be coupled to the controller 402 via the corresponding network segment 410A. For example, FIG. 4 shows the group 412D coupled to the controller 402 via the network segment 410D. Each of the groups 412 of the target machines 408 may be comprised of one or more target machines, and the target machines in each of the groups 412 may be comprised of the same or different hardware environments.

As shown in FIG. 4, the controller 402 may comprise a job request queue 414. The requests 404 may also be referred to as jobs. The job request queue 414 may be configured to receive the requests 404 and determine, based on a request 406A for example, a target machine and an installation job corresponding to the request 406A. The job request queue 414 may receive and organize the requests 404. The controller 402 may also comprise a job dispatcher 416, and the job dispatcher 416 may be coupled to the job request queue 414. According to an embodiment, the job dispatcher 416 may be configured to determine a location of each target machine of the target machines 408. For example, the job dispatcher 416 may use the machine name in a request 406A to look up a location corresponding to the machine name. In some embodiments, the job dispatcher 316 may use a lookup table 422 to determine a location, and the lookup table 422 may be stored in memory 418. For example, the job dispatcher 416 may use the lookup table 422 to determine that the target machine with the machine name "machine abc" is located at "location 1." The memory 418 may be internal and/or external to the controller 402. Based on a machine location of a target machine, the job dispatcher 416 may route an installation job a run queue 418. For example, the job dispatcher may route an installation job corresponding to "location 1" to run queue 418A because run queue 418 may be coupled to "location 1." According to some embodiments, one or more run queues correspond to a location. For example, each of the run queues 418 may be coupled to a group 412 of the target machines 408, via a network segment 410, at a location. FIG. 4, for example, shows the run queue 418A coupled to group 412A via network segment 410A.

In an embodiment, each run queue 418 may comprise a dedicated set of workers 420. For example, a set of workers 420A may be configured to service multiple installation jobs that are pending in the corresponding run queue 418A. When an installation job is serviced, for example, an operating system may be installed on a target machine. According to embodiments, the controller 402 is aware of the topology of the network, and the job dispatcher 416 may route jobs to optimize performance of each network segment 410 according to the topology. For example, the controller 402 may determine an available bandwidth of a network segment 410D. The controller may also monitor a bandwidth requirement of a target machine in the group 412D. Based on the bandwidth requirement of the target machine and the available bandwidth of the network segment 410D coupled to the target machine, the controller 402 may choose a specific time to provision the target machine. For example, if the controller 402 determines that the available bandwidth is below a determined bandwidth requirement of a target machine, the controller 402 may delay provisioning the target machine and/or the controller may provision a different target machine on the network segment. For example, the controller 402 may choose, while the determined available bandwidth of a network segment 410D is low, to provision a target machine that may use less bandwidth than the provisioning of another target machine on the network segment 410D. According to an embodiment, the controller 402 may control the target machines, for example, to efficiently use the bandwidth of each of the network segments 410.

Figure 5:
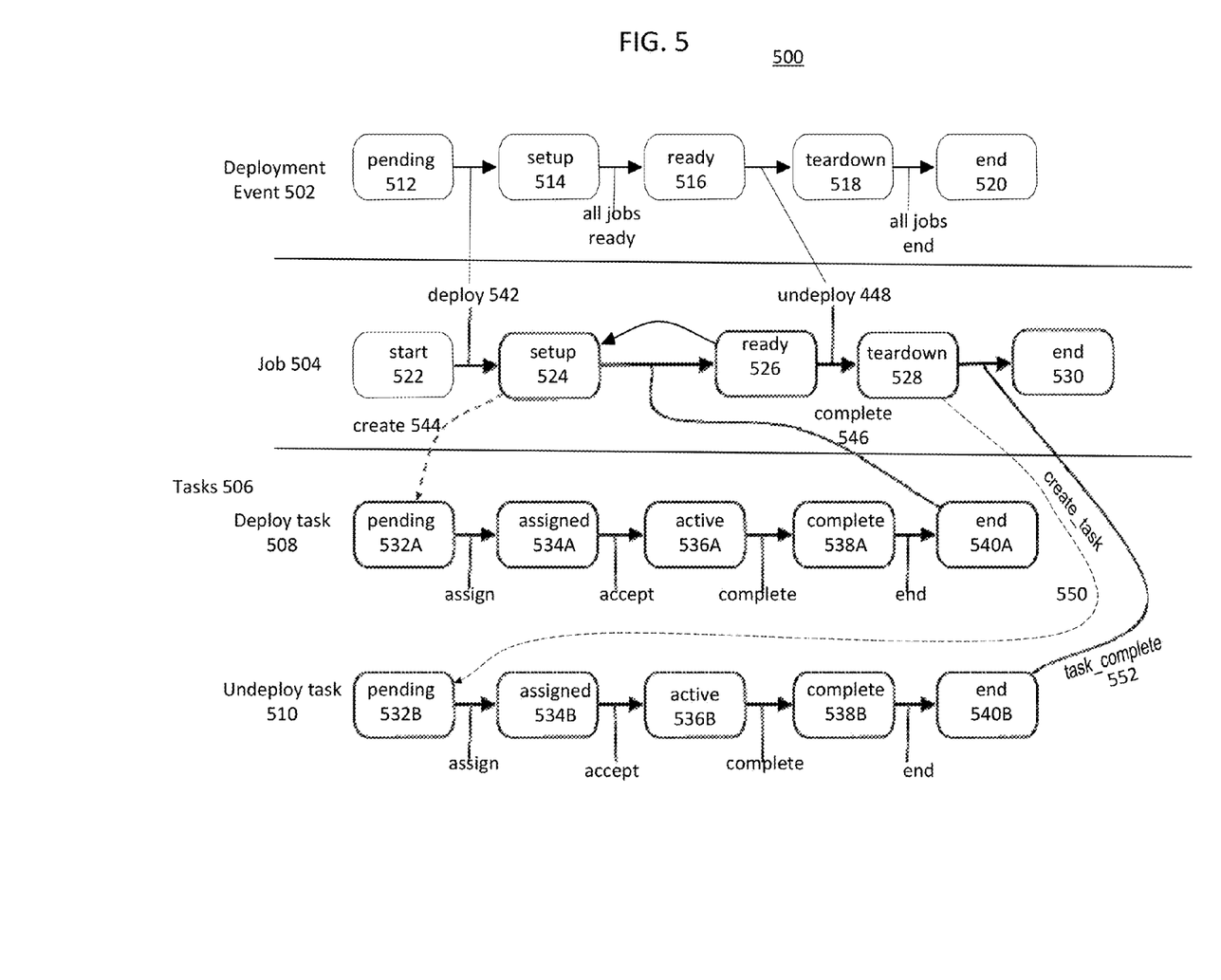
FIG. 5 is an example system state diagram illustrating exemplary state machines of a controller.

According to an embodiment, a controller, such as the controller 202 in FIG. 2 and/or the controller 402 in FIG. 4 for example, may maintain one or more state machines. FIG. 5 illustrates an exemplary system state diagram 500 in accordance with embodiments. According to an embodiment, a controller (e.g., or deployment engine) may maintain state machines for each operating system deployment (e.g., or installation). An operating system deployment may be referred to as a job, and a collection or group of operating system deployments may be referred to as a deployment event. FIG. 5 shows exemplary states for a deployment event 502 and a job 504. States may correspond to one or more statuses of a software deployments and/or operating system installations. For example, exemplary states in the deployment event may include pending 512, setup 514, ready 516, teardown 518, and end 520 for example. Exemplary states in the job 504 may include start 522, setup 524, ready 526, teardown 528, and end 530 for example. Each state in a job 504 may be associated with one more tasks 506, such as a deploy task 508 and/or an undeploy task 510. A task 506 may carry out the work of deploying and/or undeploying an operating system for example. Exemplary states of a task 506 may include pending 532, assigned 534, active 536, complete 538, and end 540 for example. According to an embodiment, a controller may implement state machines to track the states (e.g., statuses) of jobs, events, and/or tasks. For example, a controller may use a state machine of the task 506 one or more times during the same job 504.

Referring to FIG. 5, three types of interlocking state machines are shown, although embodiments are not limited to a state machine per a deployment event 502, a job 504, and tasks 506. Each step in a deployment or installation process may be referred to as a milestone. A controller may implement state machines to monitor milestones. For example, when a milestone is completed, a state in a job 504 and/or a deployment event 502 may change. State machines may also detect errors and report errors, for example, if milestones are reached out of order or at an incorrect time.

According to an embodiment, a controller may implement state machines that may receive actions, such as an event or a milestone for example, that may trigger a state change. An external stimulus, such as a user input to a controller for example, may trigger a state change. In various embodiments a change in state machine may trigger a change in another state machine. For example, a user of the recovery automation system 200 in FIG. 2 may issue an operating system deploy command 542 (e.g., via request 212). For example, a user may wish to install an operating system on a target machine. When the command is issued, the deployment event 502 may change from the pending state 512 to the setup state 514. The job 504 related to the deployment event 502 and the corresponding command 542 may change from a start state 522 to a setup state 524. The transition from the start state 522 to the setup state 524 may create a deploy task 508 (e.g., via a create task command 544) which may begin at the pending state 532A. In the example deploy task 508, a controller may assign the task 508 and the state may change to an assigned state 534A. When the task 508 is accepted, for example, the state may change to an active state 536A, and the task may change to a complete state 538A when it is completed. The controller may transition the task 508 to its end state 540A after completion. When the task 508 reaches its end state 540A, a task complete message 546 may be sent to job 504 and may trigger a state change from the setup state 524 to the ready state 526. If the job is redeployed, for example, the ready state 526 may return to the setup state 524 and the task 508 may be completed again.

In accordance with various embodiments, a controller may complete an undeploy job, such as removing an installed operating system from an installed target machine for example. When an undeploy command 548 is issued, for example, the deployment event 502 may change from the ready state 516 to the teardown state 518. The job 504 related to the deployment event and the corresponding command 548 may change from the ready state 526 to the teardown state 528. The transition to the teardown state 528 may create an undeploy task 510 (e.g., via a create task command 550) which may begin at the pending state 532B. In the example task 510, a controller may assign the task 510 and the state may change to assigned 534B. When the undeploy task 510 is accepted, for example, the state may change to an active state 536B, and the task 510 may change to a complete state 538B when is it is done. The controller may transition the task 510 to its end state 540B after completion. When the task 510 reaches its end state 540B, a task complete message 552 may be sent to job 504 and may trigger a state change from the teardown state 528 to the end state 530.

Although the deployment event 502 in FIG. 5 contains one job 504, a deployment event may be comprised of one or more jobs. For example, each job may represent a deployment to a target machine. A deployment event may be comprised of related jobs. Each related job may alert the containing deployment event when jobs are completed. When each job transitions to a ready state, the related deployment event may transition to a ready state. According to an embodiment, state machines, such as those illustrated by the system state diagram 500 for example, may be used to provide alerts to a user interface and/or a controller when deployment events, jobs, and/or tasks are completed.

Figure 6:
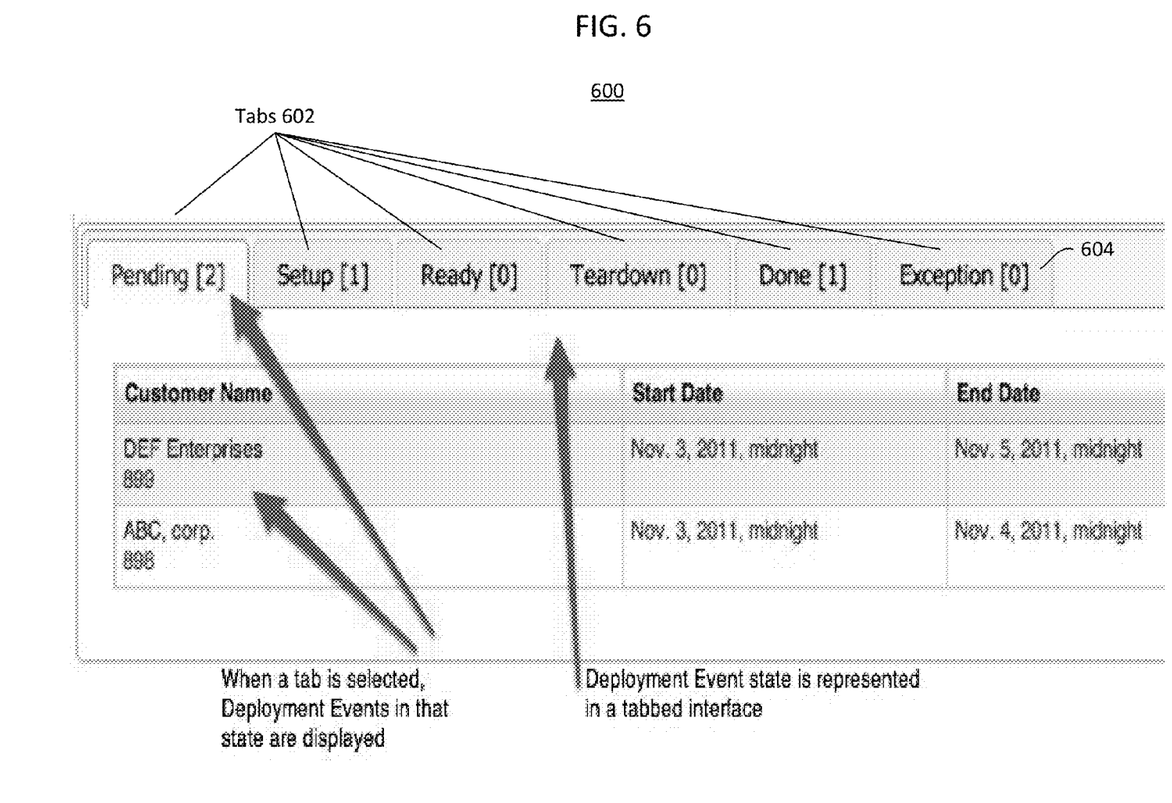
FIG. 6 is an example embodiment of a user interface display.
Figure 7:
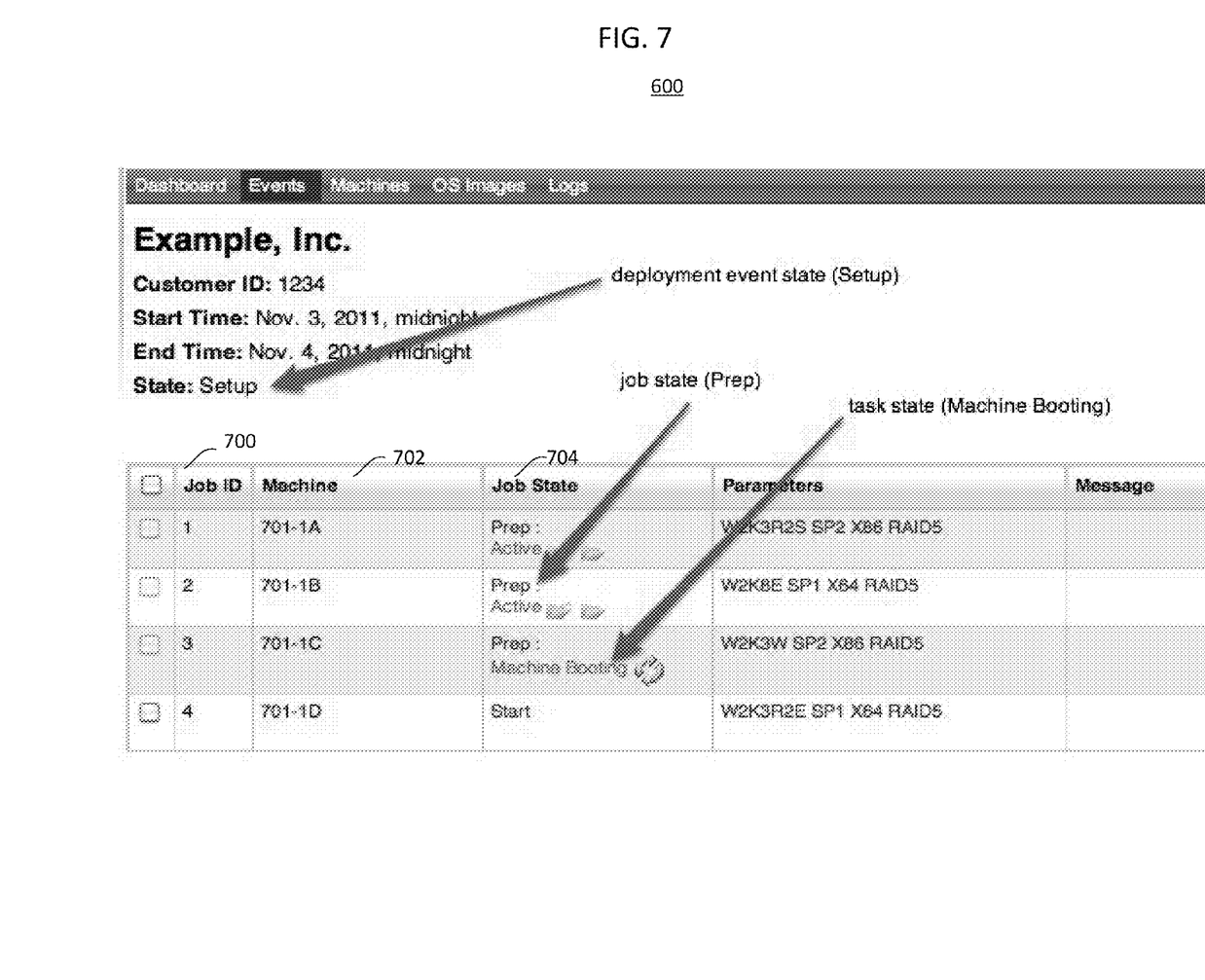
FIG. 7 is another example of a display of a user interface.

FIG. 6 illustrates an exemplary screenshot of an exemplary interface 600. For example, the interface 600 may allow a user to view specific information. The interface 600 may include drop down menus. For example, the interface 600 may display statuses of deployment events jobs, and/or tasks. The interface 600 may be internal or external to a controller and/or deployment engine, such as the controller 202 in FIG. 2 or the controller 402 in FIG. 4 for example. The interface may be arranged using the tabs 602. For example, interface 600 may display tabs corresponding to a state in a deployment event. A user, for example, may view the deployment events that are in a particular state by selecting the tab associated with the state. The tabs may correspond to states in the deployment event state machine (e.g., deployment event 502 in FIG. 5), and the exception tab 604 may be used to display errors. Interface 600 may also display jobs in a single event view as illustrated in FIG. 7. For example, each job in a deployment event may display a job identification 700. A target machine corresponding to each job may be displayed in a machine column 702. The interface may also display each job's state in the job state column 704 and a state of the job's task in the job state column 704. For example, the job with job identification "3" is in a "prep" state. As an example, the task corresponding to job identification "3" is displayed as in a "machine booting" state.

Figure 8:
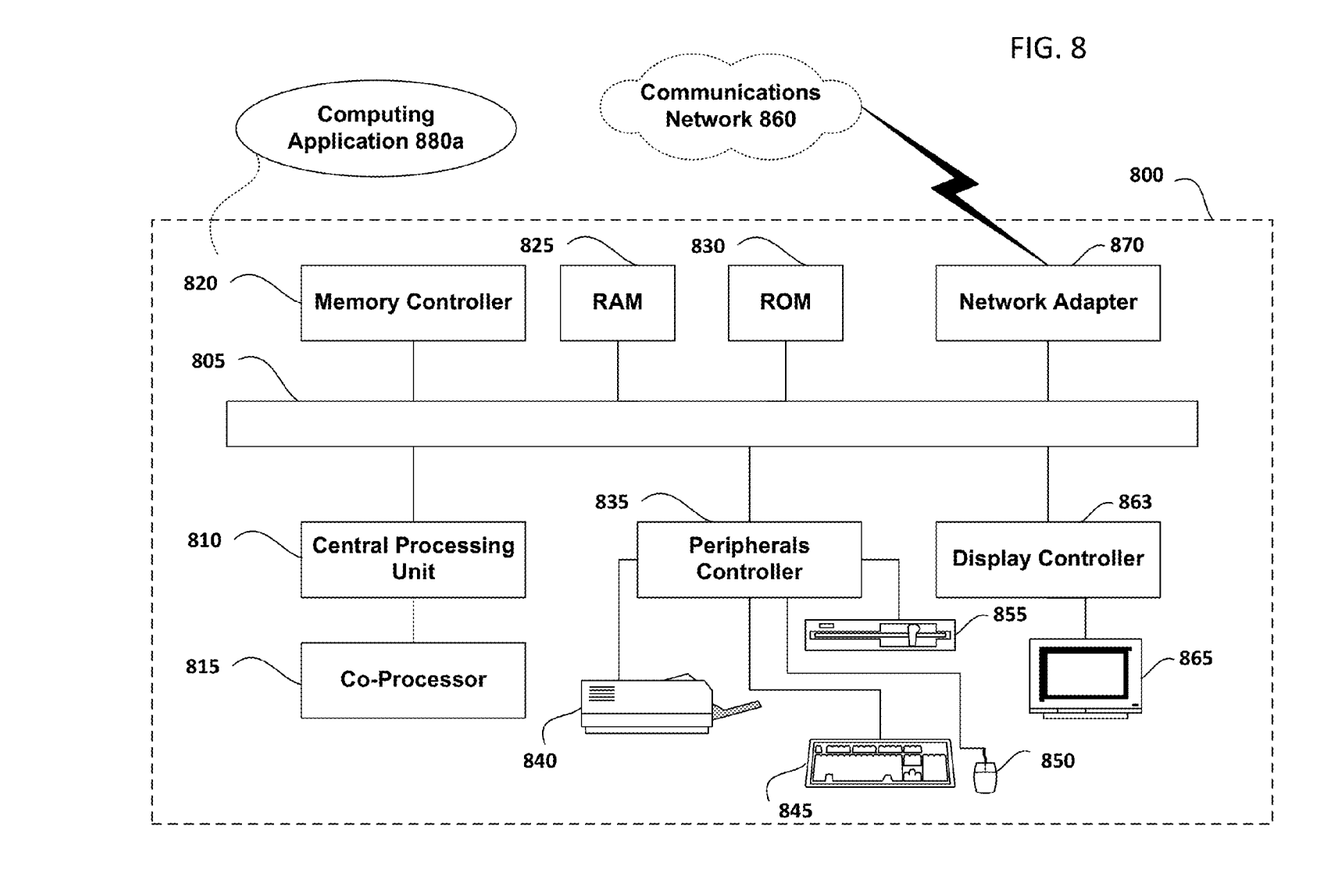
FIG. 8 is a block diagram of another exemplary computing system.

FIG. 8 is a block diagram of an exemplary computing system on which, for example, the deployment engine 100, the recovery automation system 200, and/or the controller 402 may be implemented. Target machines 408 may also be implemented by the exemplary computing system 800. Computing system 800 may be controlled primarily by computer readable instructions, which may be in the form of software, wherever, or by whatever means such software is stored or accessed. Such computer readable instructions may be executed within central processing unit (CPU) 810 to cause computing system 800 to do work. In many known workstations and personal computers, central processing unit 810 is implemented by a single-chip CPU called a microprocessor. In other machines, the central processing unit 800 may comprise multiple processors. Coprocessor 815 is an optional processor, distinct from main CPU 810, and may perform additional functions or assist CPU 810.

In operation, CPU 810 may fetch, decode, and execute instructions, and transfer information to and from other resources via the computer's main data-transfer path, system bus 805. Such a system bus connects the components in computing system 800 and defines the medium for data exchange. System bus 805 may include data lines for sending data, address lines for sending addresses, and control lines for sending interrupts and for operating the system bus. An example of such a system bus 805 is the PCI (Peripheral Component Interconnect) bus.

Memory devices coupled to system bus 805 may include random access memory (RAM) 825 and/or read only memory (ROM) 830. Such memories include circuitry that allows information to be stored and retrieved. ROMs 830 may generally contain stored data that cannot easily be modified. Data stored in RAM 825 may be read or changed by CPU 810 or other hardware devices. Access to RAM 825 and/or ROM 830 may be controlled by memory controller 820. Memory controller 820 may provide an address translation function that translates virtual addresses into physical addresses as instructions are executed. Memory controller 820 may also provide a memory protection function that isolates processes within the system and isolates system processes from user processes. Thus, a program running in a first mode may access memory mapped by its own process virtual address space; it may not access memory within another process's virtual address space unless memory sharing between the processes has been set up.

In addition, computing system 800 may contain peripherals controller 835 which may be responsible for communicating instructions from CPU 810 to peripherals, such as, printer 840, keyboard 845, mouse 850, and disk drive 855.

Display 865, which may be controlled by display controller 863, is used to display visual output generated by computing system 800. For example, display 865 may display interface 600. Such visual output may include text, graphics, animated graphics, and video. Display 865 may be implemented with a CRT-based video display, an LCD-based flat-panel display, gas plasma-based flat-panel display, or a touch-panel. Display controller 863 may include electronic components used to generate a video signal that is sent to display 865.

Further, computing system 800 may contain network adaptor 870 that may be used to connect computing system 800 to an external communications network 860. Communications network 860 may provide computer users with means of communicating and transferring information electronically. Communications network 860 also may include but is not necessarily limited to fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. Additionally, communications network 860 may provide distributed processing, which involves several computers and the sharing of workloads or cooperative efforts in performing a task. It will be appreciated that the network connections shown are exemplary and that other means of establishing a communications link between the computers may be used.

The systems, methods and processes described herein may be embodied in the form of computer executable instructions (i.e., program code) stored on a computer-readable storage medium which instructions, when executed by a machine, such as a computer, perform and/or implement the systems, methods and processes described herein. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer. Computer readable storage media do not include signals.

Changes may be made to the above-described embodiments of the invention without departing from the broad inventive concepts thereof. This invention is not limited to the particular embodiments disclosed but is intended to cover all modifications which are in the spirit and scope of the invention as defined by the appended claims.

What is claimed:

1. A computer-implemented method comprising:
receiving a request to install one of a plurality of different operating systems on one of a plurality of heterogeneous target machines, two or more of which comprise different hardware environments, the request comprising a name of the operating system to be installed and a name of the target machine;
selecting, by a controller and based on the name of the operating system and the name of the target machine in the received request, a corresponding interface driver from a set of interface drivers coupled to the controller, each interface driver in the set being associated with a different operating system type and a different target machine type that a user may request to be installed, and each interface driver being a set of executable instructions specific to one of the different operating systems and one of the heterogeneous target machines, the set of executable instructions in the interface drivers providing a common set of commands for the controller to communicate with the plurality of different operating systems and the plurality of heterogeneous target machines;
invoking, by the controller, the corresponding interface driver;
issuing, via the corresponding interface driver invoked by the controller, one or more of the common set of commands to the target machine named in the request to install the operating system named in the request on the target machine; and
wherein issuing, via the corresponding interface driver invoked by the controller, one or more of the common set of commands to the target machine to install the named operating system further comprises:
determining an installation type of the operating system named in the request from a table that associates the name of the operating system in the received request and an associated install type, the associated install type being one of at least a scripted type or an image type;
when the table indicates the installation type is a scripted type, sending to the target machine, a location of a scripted installer for the operating system to be installed; and
when the table indicates the installation type is an image-based type, loading the operating system on the target machine, wherein the operating system comprises a plurality of imaging tools.

2. The method of claim 1, further comprising:
receiving an other request to install an other operating system on an other target machine;
selecting, by the controller and based on a name of the other operating system and a name of the other target machine in the other received request, and selecting an other corresponding interface driver from the set of interface drivers;
invoking, by the controller, the other corresponding interface driver; and
issuing, via the other corresponding interface driver invoked by the controller, one or more other commands of the common set of commands to the other target machine to install the other operating system on the other target machine, wherein the other target machine is comprised of a hardware environment different than the hardware environment of the named target machine named in the request.

3. The method of claim 1, the method further comprising:
in response to one of the one or more commands issued to the named target machine, changing a hardware configuration of the named target machine.

4. The method of claim 3, wherein changing the hardware configuration of the named target machine further comprises:
loading a network bootloader on the target machine;
sending a unique identifier from the named target machine to the controller;
providing, by the controller, a bootloader configuration to the named target machine, the bootloader configuration indicating a location of the operating system to be installed.

5. The method of claim 1, further comprising:
monitoring the issuing of the one or commands of the common set of commands to install the named operating system named in the request;
based on the monitoring, reporting one or more statuses to a user interface of the controller; and
displaying the one or more statuses on the user interface.

6. The method of claim 1, further comprising:
monitoring the controller and the target machine named in the request;
receiving, via the controller, a deployment command;
in response to the deployment command, changing a deployment event in a user interface of the controller to a setup state;
after the operating system is installed on the named target machine, providing a job completed alert to the user interface of the controller;
displaying, by the user interface, an indication of the job completed alert.

7. The method of claim 1, further comprising:
detecting an error while issuing, via the corresponding interface driver invoked by the controller, one or more of the common set of commands to the named target machine to install the operating system named in the request on the target machine;
reporting the error to a user interface of the controller; and
displaying, by the user interface, an indication of the error.

8. The method of claim 1, further comprising:
removing, by the controller, an installed operating system from a target machine in the plurality of heterogeneous target machines.

9. A computer system comprising:
a memory storing a set of interface drivers, each interface driver in the set of interface drivers being a set of executable program instructions configured to issue a set of common commands to a selected one of a plurality of target machine types for installing a respective one of a plurality of different operating systems on the selected target machine type, the interface drivers collectively providing the set of common commands for the plurality of different operating systems and the plurality of machine types to communicate with a controller;
the memory also storing a table associating an operating system name with an install type, the install type being one of at least a scripted type or an image type; and
a processor operating as the controller and further configured to:
select from the memory, based on a received user request comprising a name of an operating system to be installed and a name of a target machine, a corresponding one of the interface drivers of the set; and
execute the corresponding interface driver, the corresponding interface driver being further configured to issue one or more of the common commands to the named target machine to install the named operating system on the named target machine; and
wherein execute the corresponding interface driver further comprises to:
determine an installation type of the operating system named in the request to select further from the memory, as specified in a table that associates the name of the operating system with a corresponding installation type;
when the table indicates the installation type is a scripted type, send to the target machine, a location of a scripted installer for the operating system to be installed; and
when the table indicates the installation type is an image-based type, load the operating system on the target machine, wherein the operating system comprises a plurality of imaging tools.

10. The system of claim 9, wherein the controller is further configured to:
select, based on an other received user request comprising an other name of an other operating system and an other name of an other target machine, an other corresponding interface driver in the set; and
invoke the other corresponding interface driver, the other corresponding interface driver being further configured to issue one or more other commands to the other named target machine to install the other named operating system on the other named target machine, wherein other target machine comprises a different hardware environment than a hardware environment of the target machine named in the request.

11. The system of claim 10, wherein the other named operating system is equivalent to the named operating system.

12. The system of claim 10, wherein the other operating system is different than the named operating system.

13. The system of claim 9, further comprising:
a group of target machines coupled to the controller and comprising the named target machine, wherein at least one target machine in the group of target machines is comprised of a different hardware environment than a hardware environment of the named target machine.

14. The system of claim 9, further comprising:
a state machine configured to:
monitor the controller and the target machine named in the request; and
provide, to a user interface of the controller, one or more statuses of one or more deployment events, wherein each deployment event of the one or more deployment events is comprised of one or more deployment jobs, and each deployment job of the one or more deployment jobs is comprised of one or more tasks.

15. The system of claim 14, wherein the user interface of the controller is configured to display the one or more statuses of the one or more deployment events, at least one status of the one or more deployment jobs, and at least one status of the one or more tasks.

16. The system of claim 9, wherein the controller is further configured to remove an installed operating system from a target machine in a group of target machines.

* * * * *